UNITED STATES PATENT OFFICE.

VICENTE MARCANO, OF CARACAS, VENEZUELA, ASSIGNOR, BY MESNE ASSIGNMENTS, TO THE MOSQUERA JULIA FOOD COMPANY, OF DETROIT, MICHIGAN.

MAKING PEPTONIZED MEAT.

SPECIFICATION forming part of Letters Patent No. 441,181, dated November 25, 1890.

Application filed November 8, 1889. Serial No. 329,665. (No specimens.)

*To all whom it may concern:*

Be it known that I, VICENTE MARCANO, of Caracas, in the Republic of Venezuela, a citizen of said Republic, have invented certain new and useful Improvements in Processes of Making Peptonized Meat, of which the following is a specification.

The invention is based on my discovery that the plants of the family of "*Bromeliaceas*," (Linn.) of which the "*Ananassa vulgaris*" (pine-apple) is the best-known type, contain organic vegetable ferments which can be successfully employed as peptonizing agents for the production or manufacture of peptonized meat.

The invention consists in a process of peptonizing meat by subjecting it in a finely-chopped state to the action of the organic vegetable ferments contained in the juice expressed from the plants of the family of *Bromeliaceas* and subjecting the meat to heat until peptonization takes place. The thick liquid thus obtained is then evaporated, dried, and finally ground into powder for use.

In practically carrying out my invention I take four kilograms of lean meat, finely chopped, and mix the same with four hundred and fifty cubic centimeters of the juice expressed from the common pine-apple, (*Ananassa vulgaris*,) which juice is diluted with the same quantity—to wit, four hundred and fifty cubic centimeters—of distilled water. The meat and juice are subjected slowly to a temperature of from 45° to 50° Celsius for from three to four hours, the mass being continually stirred during this time, after which the temperature is raised to 60° Celsius, at which temperature the whole mass becomes dissolved, so as to form a thick liquid or paste. At this stage the meat has been perfectly digested by the juice of the pine-apple, owing to the action of the organic vegetable ferments contained in the same, the meat being then thoroughly peptonized. The thick liquid or paste thus obtained is then strained, so as to clear it of any remaining cartilaginous tissues, the strained liquid being then evaporated *in vacuo* at a temperature not exceeding 60° Celsius. When the mass is thoroughly dry, it is ground into powder of different degrees of fineness, which is a perfectly-peptonized powdered meat, and can be placed on the market in cans or jars in the usual manner.

In place of the juice of the pine-apple the juice of any other fruit of the *Bromeliaceas* family, or even the juice of the leaves may be employed, though the juice of the fruit is preferred.

This peptonized powdered meat is a new food product which presents various physical characteristics that distinguish it from all other peptone preparations. These characteristics are mainly the following: First, it does not produce a precipitate or turbidity in its clear solution with potassium ferro-cyanide, while all others do it; second, mixed with concentrated sulphuric acid, the borders of its mixture become of a beautiful red tint after one hour's exposure to air, which all other peptone preparations fail to do; third, it does not contain any peptonized collagen rendered only diffusible by the usual way of peptonization, but it contains an absolutely soluble hydrated collagen; fourth, it contains all the digestible constituents of meat in a perfectly soluble, and therefore absorbable, state; fifth, analyses made have shown that it contains ten thousand eight hundred and nine per cent. of original nitrogen, being a higher percentage than that contained in other peptone preparations; sixth, it contains the fibrinous parts of the meat in a finely-powdered state; seventh, it is entirely free from foreign admixtures, such as salt, starch, and the like; eighth, it contains no substance foreign to thoroughly-peptonized meat in a dry state as peptonized by the action of the gastric juice; ninth, it will keep for a considerable length of time even if exposed to the air.

In a concurrent application filed July 31, 1889, Serial No. 319,318, I have described and claimed the manufacture of pure peptones from peptonized meat, and I therefore do not claim in this application anything contained in the application referred to.

Having thus described my invention, I claim as new and desire to secure by Letters Patent—

1. The process herein described of making peptonized meat, which consists in subjecting finely-chopped meat to the action of the organic vegetable ferments contained in the juice expressed from the plants belonging to the family of *Bromeliaceas* until peptonization takes place, then evaporating and drying the thus-obtained liquid peptonized meat, and finally grinding it into powder, substantially as set forth.

2. The herein-described peptonized meat-powder, being free from foreign admixtures—such as salt, starch, and the like—said powder containing all the digestible constituents and fibrinous parts of the meat, and obtained by treating the finely-divided meat with juices of the plants of the family of *Bromeliaceas*, and heating, drying, and grinding the same, substantially as set forth.

In testimony that I claim the foregoing as my invention I have signed my name in presence of two subscribing witnesses.

VICENTE MARCANO.

Witnesses:
 ED. MARTURET,
 Y. A. MOSQUERA, Hijo.

It is hereby certified that in Letters Patent No. 441,181, granted November 25, 1890, upon the application of Vicente Marcano, of Caracas, Venezuela, for an improvement in "Making Peptonized Meat," an error appears in the printed specification requiring correction, as follows: In line 78-9, the words "it contains ten thousand eight hundred and nine per cent. of original nitrogen," should read *it contains ten and eight hundred and nine one-thousandths per cent. of original nitrogen;* and that the said Letters Patent should be read with this correction therein that the same may conform to the record of the case in the Patent Office.

Signed, countersigned, and sealed this 16th day of December, A. D. 1890.

[SEAL.] CYRUS BUSSEY,
*Assistant Secretary of the Interior.*

Countersigned:
    C. E. MITCHELL,
        *Commissioner of Patents.*